(12) United States Patent
Hansen et al.

(10) Patent No.: US 9,055,146 B2
(45) Date of Patent: Jun. 9, 2015

(54) SOCIAL NETWORK BASED CALL MANAGEMENT

(75) Inventors: Joseph A. Hansen, Coral Springs, FL (US); Mark E. Peters, Chapel Hill, NC (US); Steven David Swanson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2119 days.

(21) Appl. No.: 12/140,610

(22) Filed: Jun. 17, 2008

(65) Prior Publication Data

US 2009/0310768 A1 Dec. 17, 2009

(51) Int. Cl.
*H04M 1/56* (2006.01)
*H04M 15/06* (2006.01)
*H04M 3/436* (2006.01)
*H04M 3/42* (2006.01)

(52) U.S. Cl.
CPC .......... *H04M 3/436* (2013.01); *H04M 3/42059* (2013.01); *H04M 2203/2072* (2013.01); *H04M 2203/655* (2013.01)

(58) Field of Classification Search
USPC ............................ 379/142.06, 142.07, 201.01
See application file for complete search history.

(56) References Cited

U.S. PATENT DOCUMENTS

| 2002/0067816 | A1* | 6/2002 | Bushnell | 379/201.02 |
| 2004/0028208 | A1* | 2/2004 | Carnazza et al. | 379/221.01 |
| 2006/0291641 | A1 | 12/2006 | Barclay et al. | |
| 2008/0155080 | A1* | 6/2008 | Marlow et al. | 709/223 |

OTHER PUBLICATIONS http://www.grandcentral.com/home/features.

* cited by examiner

*Primary Examiner* — Oleg Asanbayev
(74) *Attorney, Agent, or Firm* — Winstead, P.C.

(57) ABSTRACT

Illustrative embodiments provide a computer implemented method, an apparatus in the form of a data processing system and a computer program product for social network based call management. In one illustrative embodiment, the computer implemented method comprises receiving an incoming call from a caller for a subscriber, and obtains preferences for the subscriber, wherein the preferences describe a caller relationship to the subscriber. Using a location provided in the preferences for the subscriber, the computer implemented method locates attributes for the caller. The computer implemented method processes the call in accordance with the attributes and the preferences.

19 Claims, 4 Drawing Sheets

| INDIVIDUAL CALLER 502 | CALLER TYPE 504 | CALLER IN A GROUP 506 | ACTIONS 508 | THIRD PARTY 510 |
|---|---|---|---|---|
| MOM ~512 | | ~514 | ALLOW ALWAYS ~520 | FACEBOOK ~516 |
| | | KNOWN TELEMARKETER ~518 | ALLOW NEVER AND REPORT CALL TO knowntelemarketers.com | knowntelemarketers.com ~522 |
| | | KNOWN TELEMARKETER ~524 | ALLOW NEVER | FACEBOOK ~528 |
| ~530 | IMMEDIATE FAMILY | ~532 | ALLOW ALWAYS ~526 | FACEBOOK ~534 |
| | | KITEBOARDING CLUB ~536 | WHEN FACEBOOK STATUS IS "AT BEACH" ALLOW ANYTIME. OTHERWISE, ALLOW 6am-10pm | FACEBOOK ~540 |
| ~542 | EXTENDED FAMILY | ~544 | ALLOW 6am-11pm; OTHERWISE SEND TO VOICEMAIL ~538 | FACEBOOK ~546 |
| ~548 | FRIENDS | ~550 | ALLOW 7:30am-10pm | FACEBOOK ~552 |
| | | ROCK CLIMBING CLUB ~554 | ALLOW 6am-10pm | FRIENDSTER ~558 |
| ANONYMOUS CALLERS ~560 | | ~562 | ALLOW NEVER ~556 | n/a ~564 |
| DEFAULT ~566 | | ~568 | ALLOW 5-8pm | n/a ~570 |

SOCIAL NETWORK BASED CALL MANAGEMENT

BACKGROUND OF THE INVENTION

1. Field of the Invention

The present invention relates generally to an improved data processing system and more specifically to a computer implemented method, an apparatus, and a computer program product for social network based call management.

2. Background Description

The use of cell phones has increased rapidly with the cell phone being the only phone for many users. As a consequence of the primary use of the cell phone, the number of calls made to an individual user's cell phone has also increased. For some users, many of the calls previously placed to land line phones have transferred over to their cellular number, including the nuisance calls and the solicitation calls. In addition, busy people are unable to or do not want to answer all incoming calls whether the calls are arriving on land line or cellular based phones. For example, a user receiving calls may wish to not answer calls from sales people, non-work related callers or unfamiliar callers. In another example, in order to maintain minutes available in the user calling plan, a user may ignore many calls to "save minutes."

Limited methods are available to restrict calls received on a mobile, work, or home phone to your friends, friends of friends, or associated groups. Typical solutions require the designation of a caller number as a key. The key is then used as search criteria to block the call or to permit the caller to continue. Presently, the choice of actions appears to be limited to either allowing or disallowing a caller from completing a call.

When friends are identified, the call is permitted to continue based on the calling number matching a list of approved caller numbers. Changes in the list of friends may involve updates to the approved list and updates to the list may be controlled and scheduled by a phone company. A friend is identified as a very specific relationship by a permitted caller in the list. There are no friends of friends. The level of relationships is only one level deep. Chaining of relations is not provided. In a similar manner, a friend cannot be a group or simply defined as a member of some larger entity.

BRIEF SUMMARY OF THE INVENTION

According to one embodiment of the present invention, a computer implemented method for social network based call management is provided. The computer implemented method receives an incoming call from a caller for a subscriber and responsive to receiving the incoming call, obtains preferences for the subscriber, wherein the preferences describe a caller relationship to the subscriber. The computer implemented method further obtains the attributes for the caller; and processes the call in accordance with the attributes and the preferences.

According to another embodiment of the present invention, a data processing system for social network based call management, comprises a bus, a memory connected to the bus, wherein the memory comprising computer-executable instructions, a communications unit connected to the bus, a display connected to the bus, and a processor unit connected to the bus. The processor unit executes the computer-executable instructions to direct the data processing system to receive an incoming call from a caller for a subscriber, responsive to receiving the incoming call, obtain preferences for the subscriber, wherein the preferences describe a caller relationship to the subscriber, obtain the attributes for the caller, and process the call in accordance with the attributes and the preferences.

According to another embodiment of the present invention, there is provided a computer program product for social network based call management. The computer program product comprises a computer-readable medium comprising computer-executable instructions tangibly embodied thereon, the computer-executable instructions comprising computer-executable instructions for receiving an incoming call from a caller for a subscriber, computer-executable instructions responsive to receiving the incoming call for obtaining preferences for the subscriber, wherein the preferences describe a caller relationship to the subscriber, computer-executable instructions for obtaining the attributes for the caller, and computer-executable instructions for processing the call in accordance with the attributes and the preferences.

BRIEF DESCRIPTION OF THE SEVERAL VIEWS OF THE DRAWINGS

FIG. 5 is a block diagram of a table of attributes and values for use in a call management system in accordance with illustrative embodiments.

DETAILED DESCRIPTION OF THE INVENTION

Figure 1:
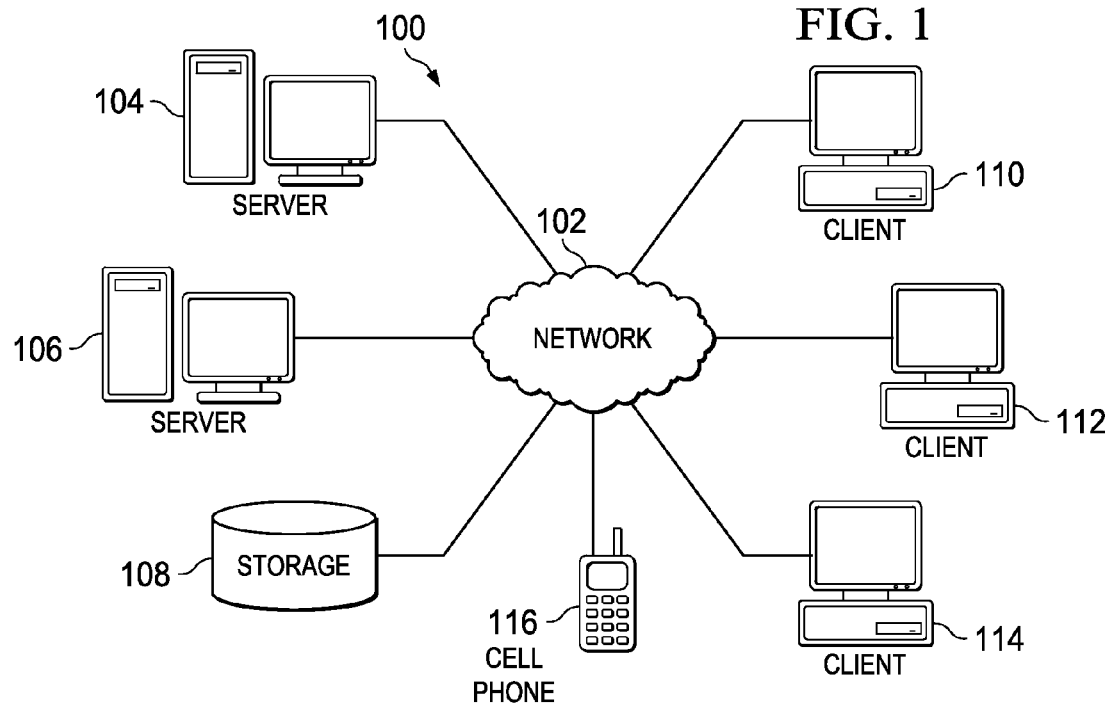
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
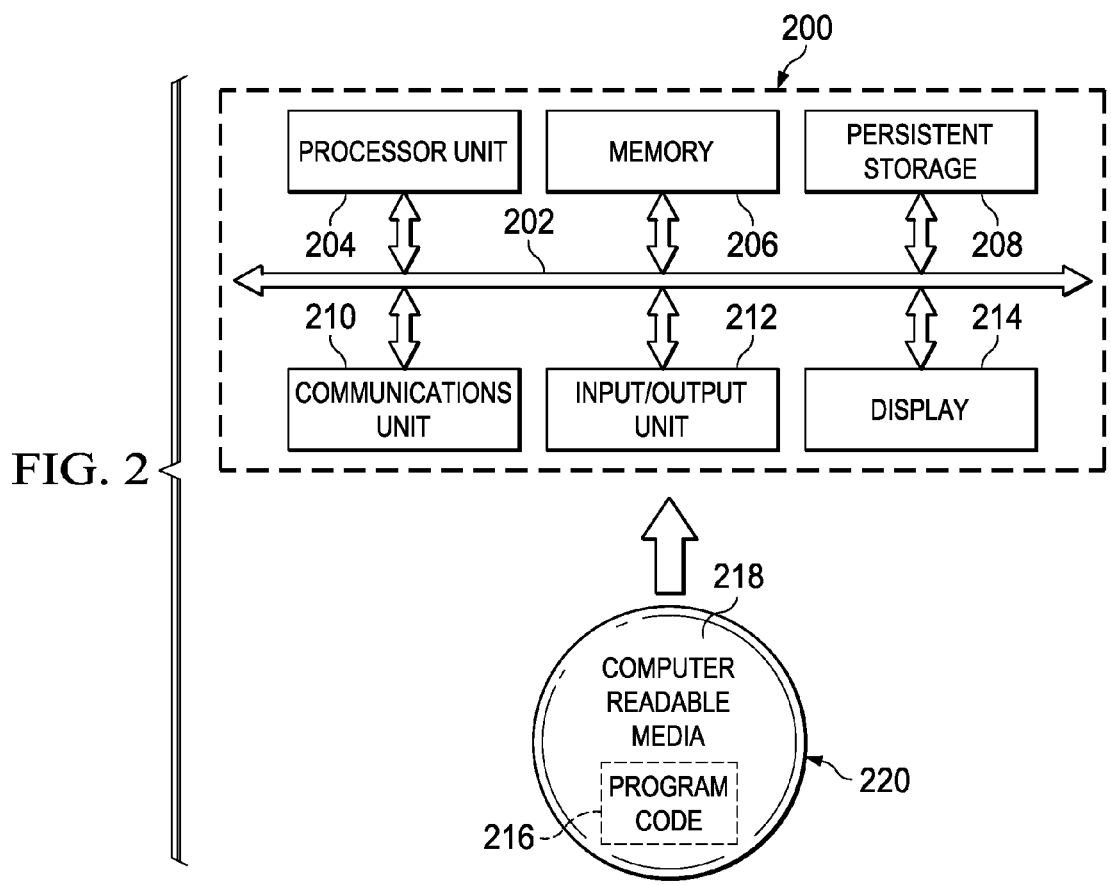
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the example, server 104 provides data, such as boot files, operating system images, and applications to clients 110, 112, and 114. Clients 110, 112, and 114 are clients to server 104 in this example. Cell phone 116 is an example of a cellular phone, or a land line phone attached to a network, wherein the network, such as network 102, may also provide phone services. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Illustrative embodiments provide a capability of determining how a subscriber prefers to have calls managed, based on the attributes of the caller. For example, attributes are assigned in the subscriber preferences, defined using the subscriber's social network information. A subscribing user on client 110 may reference social network information contained on server 104. The social network information on server 104 may then be used by the subscriber, or a phone service provider on server 106, to specify relationships used with specific call handling options. For example, a caller identified as a friend in the social network information on server 104 may be permitted to call after 6 PM. When a call arrives for the subscriber on cell phone 116, the phone service on server 106 determines when the call is to proceed. In this example, the call is determined to be from a friend and an applicable rule allows the call to proceed.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer recordable storage media. In some instances, computer recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
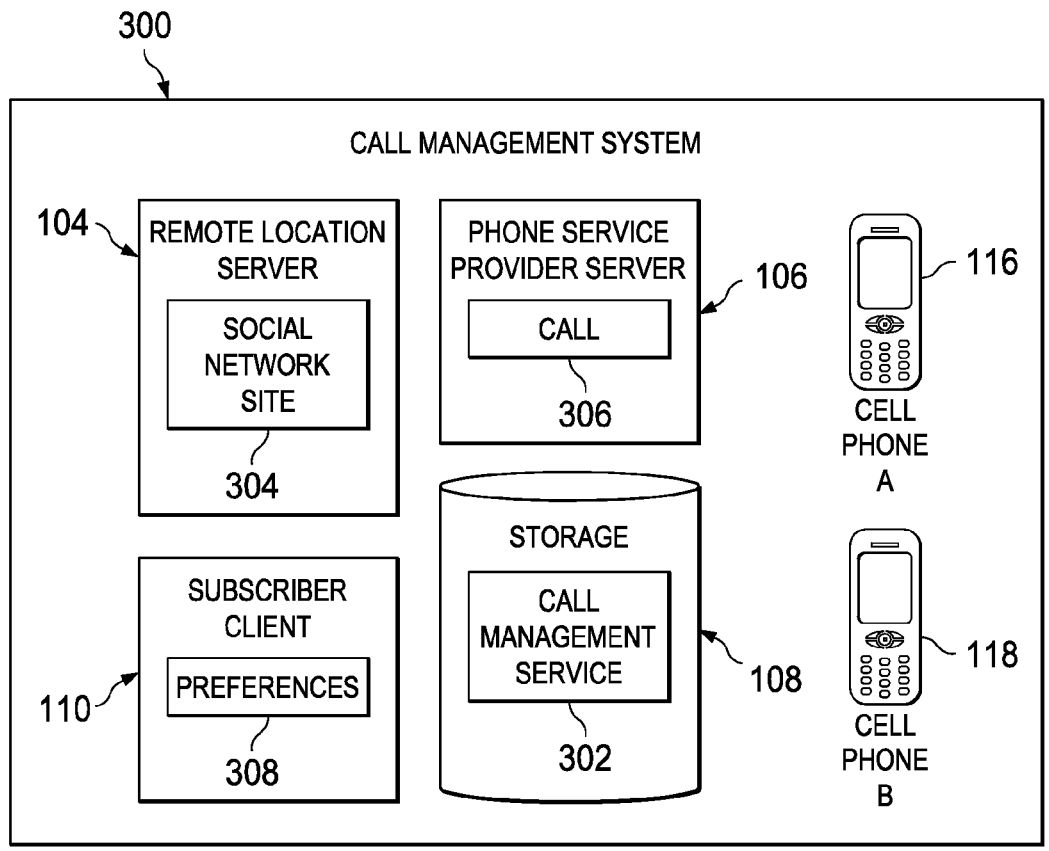
FIG. 3 is a block diagram of a call management system in accordance with illustrative embodiments.

With reference to FIG. 3, a block diagram of a call management system, based on a social network, in accordance with illustrative embodiments is shown. A high level view of components of call management system 300 may be seen contained within the context of components of the network system of FIG. 1. Components representing a social network based call management service 302 are contained within storage 108, but the components may also exist in other locations as required.

For example, call management service 302 may reside as a set of components on phone service provider server 106 and provide an equivalent level of function. The social network based call management system comprises a set of servers connected to the network, such as network 102 of FIG. 1, wherein the call management service and a set of preferences for the subscriber of the call management service are located on the set of servers. The set of servers refers to one or more servers. The social network site 304 is also connected to the network through hosting services of remote location server 104.

The social network site contains attribute information for a relationship between the subscriber and the caller. The attribute information may also be contained as a classification of a caller in a network based directory such as a law enforcement directory. Further attribute information may also be obtained from a membership list on a site maintained by a group, such as a kiteboarding group.

The various sites maintain the caller information and the subscriber need not update phone numbers of friends, family and other contacts. The friends, family and contacts maintain their own phone number information. The relationships are thus utilized to apply the most current contact information.

The telephone service provider can leverage the caller and the subscriber relationship information to provide better service to the subscriber.

Call processing occurs when a call 306, is placed to subscriber cell phone 116 from caller cell phone 118. A subscriber is defined as a user having call management services. Subscribers may be tracked in a list of subscribed users or a database providing information on identified users of the call management service. Typically, a subscriber has an associated set of preferences describing how the subscriber wishes to have calls handled according to the incoming caller. The call travels through network 102. A set of subscriber preferences 308 may exist in a repository managed by the phone service provider or may be maintained in a remote location such as remote location server 104 or subscriber client 110 as shown. Remote location server 104 may be a social networking site to leverage subscriber information already stored. The subscriber information contains relationships defining social interaction between the subscriber and other users that is useful. When the called phone, whether land line, cellular or voice over internet protocol type, belongs to a subscriber of the call management service, the call management service will locate and use the subscriber preferences to process the incoming call.

Figure 4:
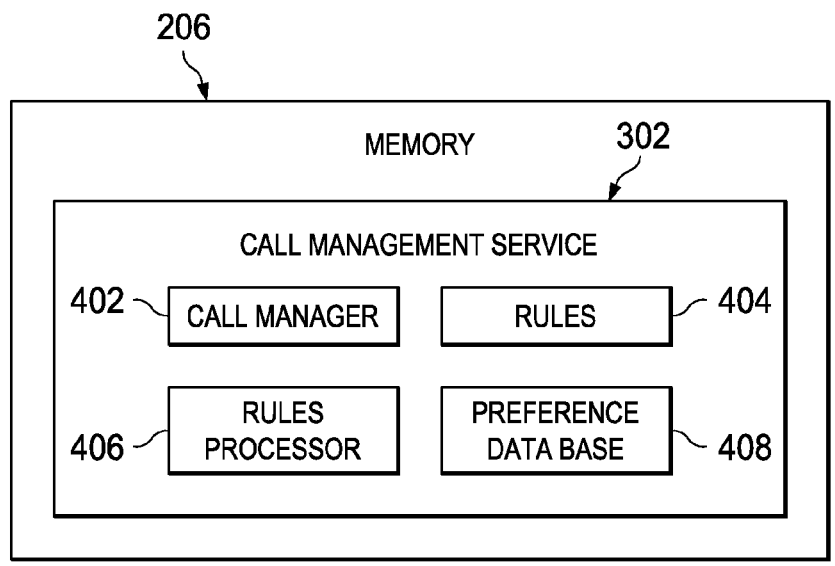
FIG. 4 is a block diagram of components of the call management system of FIG. 3, in accordance with illustrative embodiments.

With reference to FIG. 4, a block diagram of components of a call management service, in accordance with the call management system 300 of FIG. 3, in accordance with illustrative embodiments, is shown. In this example, a high level view of components of call management service 302 of FIG. 3 may be seen contained within memory 206 of FIG. 2. Although the components are shown within memory 206, the components may be stored in another storage area, such as storage 108 of FIG. 1 or persistent storage 208, until needed for processing by processor unit 204 of FIG. 2.

Call management service 302 typically contains a number of integrated components comprising call manager 402, rules 404, rules processor 406 and a preference database 408. Call manager 402 provides overall coordination of the other components of call management service 400. In addition, call manager 402 receives the call and determines what is required to process the call. Call processing will adhere to the preferences of the subscriber, if the called party has subscribed and has user preference. Rules 404 are used by rules processor 406 to implement the call preferences of the subscribing user. Rules 404 contain a set of rules. The set of rules may be one or more rules describing processing of a received call. A rule typically is in the form of a condition portion and an action portion. When the stated condition has been met, the associated action defined in the action portion is executed. Rules processor 406 provides the capability to execute the rules as defined and provided by rules 404. Rule processor 406 may be any processor suitable for processing the rules as defined. For example, rules processor 406 may be a script execution processor suitable for processing rules defined in a scripting language.

Preference database 408 contains information defining the subscriber preferences. The information is comprised of identifiers and attributes describing a caller. For example, a social network Internet site, such as remote location server 104 of FIG. 3, contains a repository of information identifying users and associated relationships of each user. A friend may be defined, within the repository for a user, along with other friends and friends of friends. This definition produces a chain of relations that may be used to identify callers. Preference data associated with the individual caller or group of callers then determines how the call management service subscriber wishes to have calls associated with the callers handled.

Attributes may be defined in a common location, such as a phone service provider site on server 106 of FIG. 3 or may be defined in multiple locations, such as various Internet based relationship sites and aggregated in a logical manner to produce a set of subscriber attributes. A set of subscriber attributes comprises one or more attributes. In either case, there is sufficient information for a caller, having been identified as having a relationship defined with the subscriber, to be processed in accordance with the subscriber preference. The contact information defined in social networks may then be leveraged. Leveraging the previously defined contact information avoids duplication of effort for the subscriber. The defined relationships are then used to manage who may call and when a call may be received by a subscriber.

With reference to FIG. 5, a block diagram of a table of attributes and values for use in a call management system in accordance with illustrative embodiments is shown. Attribute table 500 contains entries for associating callers with actions to take when the call is received from that caller. Entries also define a relationship to the subscriber, and if a third party repository is used, where the location of the repository.

In this example of a resource, the header row comprises individual caller 502 caller type 504, caller in a group 506, actions 508 and third party 510. The table as depicted need not be implemented as shown. The example shows, in a convenient format, the typical type of information needed, attributes, necessary to manage the calls. The collection of attributes defines the subscriber preference.

Individual caller 502 identifies the caller by name and phone number. The caller phone number may be used as a convenient identifier that is readily available from the phone service providers. Caller type 504 identifies the type of relationship that the caller has with the subscriber. Caller group 506 defines a number of entries comprising, immediate family, extended of family, and friends. The caller group may also include categories of personal and business. Personal may also include entries such as family, friend, and friend of friend. Caller in a group may define an interest group, such as a local kiteboarding group or families who go to the same school.

Actions 508 identifies the specific action to take when the call is received. Actions include a format of "what action," and "when to occur." The timing also includes a before and after choice. Third party 510 identifies a name and location of a third party repository to be used to retrieve further relationship information. Location information may specify the path needed to find the information resource. Access control information, if required, is also specified. An entry in the table has a higher priority than one from a third party. Authorization is in two forms, individuals and group. A caller may or may not be a member of the group. For example a caller may not be in a "law enforcement group," but the subscriber will still want to receive calls from local jails or law enforcement offices.

Mom 512 indicates the entry is for the mother of the subscriber. The action field is "allow always" 514 allowing the call to be processed always. The third party 520 contains the name and location for the subscriber repository containing the attribute information that identifies the caller. For example, the entry corresponding to mom is set to "facebook" 516 identifying an Internet location. A userid and password may also be provided to allow the phone service provider to access the subscriber entry to extract the caller attributes. If the first two fields were blank, the third party information could be used exclusively to manage the action taken for the calls.

An entry for "known telemarketers" 518 is provided with an action set to "allow never and report call to telemarketers.com 520. The location to retrieve information from is called "knowntelemarketers.com" 522. "Known telemarketers" 524 is provided with an action set to "allow never 526. The location to retrieve information from is called "facebook" 528, identifying a different subset of telemarketers and different processing rule.

A "immediate family" 530 entry identifies those belonging to the subscriber's immediate family. Call action is set to "allow always" 532 while relationship information may be obtained from location "facebook" 534.

A caller in group value of "kiteboarding club" 536 has an assigned action setting of "When facebook status is at the beach, allow anytime; otherwise allow 6 am-10 pm." The information on club members is found in the location of "facebook" 540.

A caller type of "extended family" 542 has an assigned action setting of "allow 6 am-11 pm; otherwise send to voicemail" 544. The information on who is a member is found in the location of "facebook" 546.

A caller type of "friends" 548 has an assigned action setting of "allow 7:30 am-10 pm" 550. The information on club members is found in the location of "facebook" 552.

A caller in group value of "rock climbing club" 554 has an assigned action setting of "allow 6 am-10 pm" 556. The information on club members is found in the location of "friendster" 558.

An individual caller "anonymous callers" 560 has an assigned action setting of "allow never" 562. The information on anonymous callers is not applicable 564. A default 566 setting is provided in which an action of "allow 5-8 pm" enables calls to pass to the subscriber in the time window indicated. Default callers have no specified location information hence not applicable 570.

Figure 6:
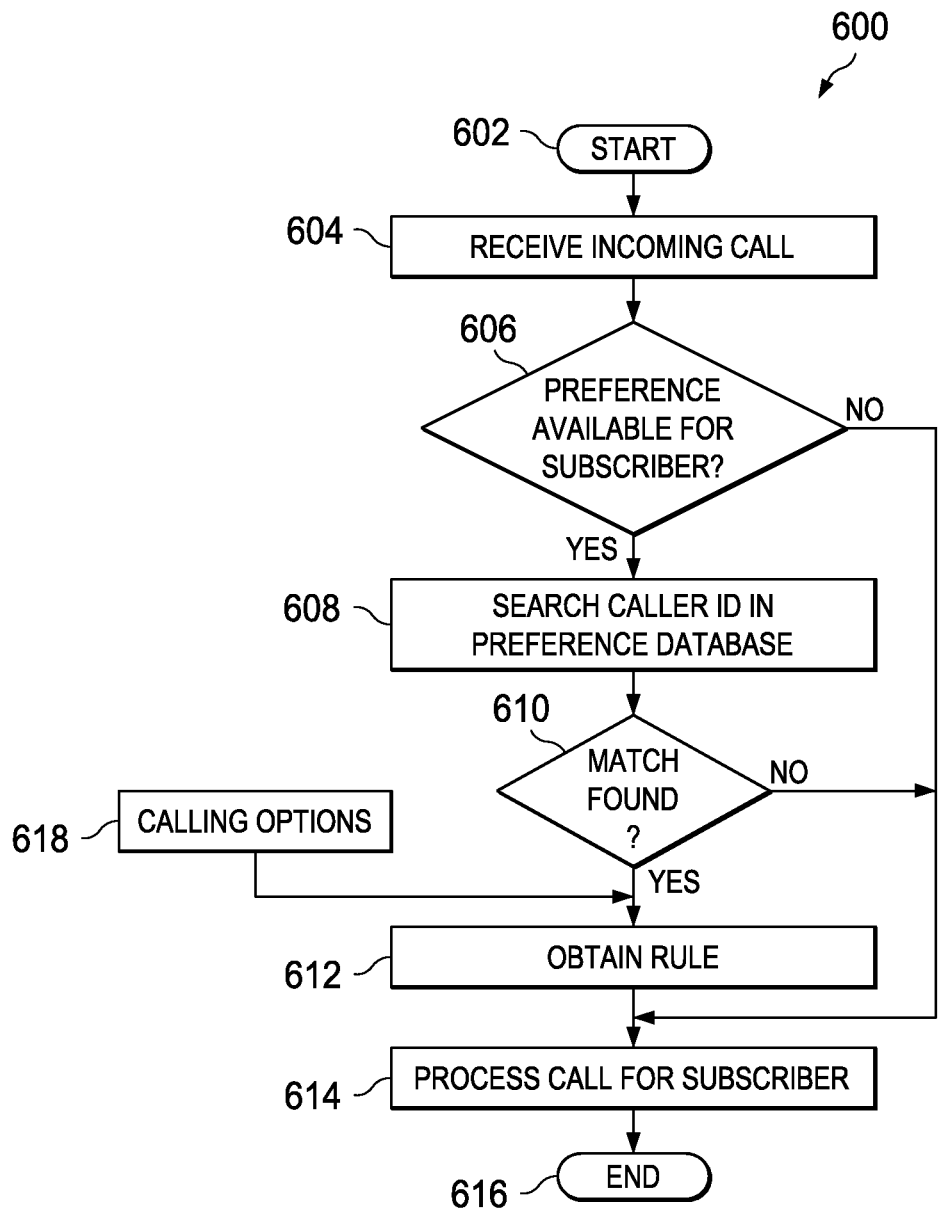
FIG. 6 is a flowchart of a call management process in accordance with illustrative embodiments.

With reference to FIG. 6, a flowchart of a call management process in accordance with illustrative embodiments is shown. Call management process 600 is an example an illustrative embodiment of call management service 302 of FIG. 3. Call management process 600 starts (step 602) and receives an incoming call from a caller for another phone user (step 604). A determination is made whether to handle the call in a conventional manner or in accordance with a subscriber preference. The determination made is whether the called user is a subscriber of the call management service, and therefore has preferences (step 606). A determination may be made by the phone service looking for the called user in a subscriber list or other suitable customer attribute reference maintained by the phone service Preferences may be located at the phone service provider location or may be remote to the phone service provider. In one example, a remote location may be the user maintained storage device including a personal computer, telephone gateway device, or cellular phone. If the preferences are available a "yes" results in step 606. If there are no preferences a "no" is obtained. If a "no" was obtained in step 606, process 600 skips to step 614 to handle the call in a conventional manner. If a "yes" was obtained in step 606, the caller identifier is searched in the social networking or a network connected database. The search location may also be a web site or web reverse phone number lookup site, to obtain identification attributes of the caller. Identification attributes include those of name, relationship, classification as a type of business or caller, or membership in a group. Examples of an attribute include the name of the caller, the relationship between the caller and the subscriber, and all of the groups in which the caller belongs. The identification attributes are then used to search the preference database of the subscriber (step 608).

If a match of the caller id is found within the subscriber preferences (step 610), a "yes" results. If no match is found, the caller id is not found and "no" results. If a "no" was obtained in step 610, process 600 skips to step 614 to process the call in a conventional manner. If a "yes" was obtained in step 610, a processing rule is obtained from a rules database (step 612). A rule describing processing of calling options may be obtained by a simple query or table look up (step 618). For example, if the caller is matched with an entry in the subscriber preference indicating a blocked call, the call would not be put through.

Having obtained the rule, the call is processed in accordance with the attributes and preferences (step 614), with process 600 terminating thereafter (step 616). Provision is made for anonymous callers and a default caller. In the absence of any rule, the call would be processed as a pass through or conventional manner (step 614) with process 600 terminating thereafter (step 616).

Thus, the illustrative embodiments provide a capability for a call management service to receive a call and identify call handling options to be applied to the call. The call handling options are the preferences of the subscribing user receiving the call. Call management services leverage attribute information provided in social networking repositories previously used by the subscriber to access and populate attributes of the caller. The attributes in combination with processing rules form the subscriber preferences to determine how an incoming call is to be managed by the call management system or service. Calls may then be processed in accordance with the subscribers' preference using relationships previously defined in social network type repositories.

Call processing, in accordance with illustrative embodiments, provides subscribers with a capability to better manage calls. Call processing may allow undesired calls to be redirected or ignored without user intervention or with less user intervention. Call management services provides the subscribers with more control over how calls are processed when received and as shown in some cases, may reduce calls received by the actual user. A user of call management services, in accordance with illustrative embodiments, may now leverage social networking information of the user to better manage incoming phone calls.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for social network based call management, the computer implemented method comprising:
   receiving an incoming call from a caller for a subscriber;
   responsive to receiving the incoming call, obtaining preferences for the subscriber;
   obtaining attributes for the caller from the social network, wherein the attributes describe a caller relationship to the subscriber;
   wherein the social network is an online community of people with common interests allowing to communicate and share information with each other; and
   processing the call in accordance with the attributes and the preferences.

2. The computer implemented method for social network based call management of claim 1, wherein the obtaining preferences for the subscriber further comprises:
   determining whether the subscriber preferences are available; and
   responsive to a determination that the subscriber preferences are available, identifying a location of the subscriber preferences.

3. The computer implemented method for social network based call management of claim 1, wherein obtaining the attributes for the caller further comprises:
   locating the attributes for the caller using a location in the preferences for the subscriber; and
   retrieving the attributes for the caller from the location.

4. The computer implemented method for social network based call management of claim 1, wherein processing the call in accordance with the attributes further comprises:
   obtaining a rule associated with the caller and the caller relationship; and
   applying the rule to process the call.

5. The computer implemented method for social network based call management of claim 1, wherein the subscriber preferences are maintained by one of the subscriber, a phone service and a third party.

6. The computer implemented method for social network based call management of claim 1, wherein the rule comprises call processing options comprising block, allow, route and forward.

7. A data processing system for social network based call management, the data processing system comprising:
   a bus;
   a memory connected to the bus, wherein the memory comprising computer-executable instructions;
   a communications unit connected to the bus;
   a display connected to the bus;
   a processor unit connected to the bus, wherein the processor unit executes the computer-executable instructions to direct the data processing system to: receive an incoming call from a caller for a subscriber;

responsive to receiving the incoming call, obtain preferences for the subscriber; obtain the attributes for the caller from the social network, wherein the attributes describe a caller relationship to the subscriber;

wherein the social network is an online community of people with common interests allowing to communicate and share information with each other; and process the call in accordance with the attributes and the preferences.

8. The data processing system for social network based call management, of claim 7, wherein the processor unit executes the computer-executable instructions to direct the data processing system to obtain preferences for the subscriber further comprises:

determine whether the subscriber preferences are available;

responsive to a determination that the preferences are available, identify a location of the subscriber preferences.

9. The data processing system for social network based call management of claim 7, wherein the processor unit executes the computer-executable instructions to direct the data processing system to be responsive to determine preferences are available for the subscriber further comprises:

locate the attributes for the caller using a location in the preferences for the subscriber; and retrieve the attributes for the caller from the location.

10. The data processing system for social network based call management of claim 8, wherein the processor unit executes the computer-executable instructions to direct the data processing system to process the call in accordance with the attributes further comprises:

obtain a rule associated with the caller and the caller relationship; and apply the rule to process the call.

11. The data processing system for social network based call management of claim 7, wherein the subscriber preferences are maintained by one of the subscriber, a phone service and a third party.

12. The data processing system for social network based call management of claim 8, wherein the rule comprises call processing options comprising block, allow, route and forward.

13. A non-transitory computer readable storage medium comprising a computer program product for social network based call management, the computer program product comprising:

computer-executable instructions tangibly embodied on the non-transitory computer readable storage medium thereon, the computer-executable instructions comprising: computer-executable instructions for receiving an incoming call from a caller for a subscriber;

computer-executable instructions responsive to receiving the incoming call for obtaining preferences for the subscriber;

computer-executable instructions for obtaining the attributes for the caller from the social network, wherein the attributes describe a caller relationship to the subscriber;

wherein the social network is an online community of people with common interests allowing to communicate and share information with each other; and computer-executable instructions for processing the call in accordance with the attributes and the preferences.

14. The computer program product for social network based call management of claim 13, wherein the computer-executable instructions for obtaining preferences for the subscriber further comprises:

computer-executable instructions for determining whether the subscriber preferences are available;

computer-executable instructions responsive to a determination that subscriber preferences are available, for identifying a location of the subscriber preferences.

15. The computer program product for social network based call management, of claim 13, wherein the computer-executable instructions responsive to determining preferences are available for the subscriber further comprises:

computer-executable instructions for locating the attributes for the caller using a location in the preferences for the subscriber; and retrieving the attributes for the caller from the location.

16. The computer program product for social network based call management of claim 14, wherein the computer-executable instructions for requesting the rule associated with the caller further comprises:

computer-executable instructions for obtaining a rule associated with the caller and the caller relationship; and computer-executable instructions for applying the rule to process the call.

17. The computer program product for social network based call management of claim 13, wherein the subscriber preferences are maintained by one of the subscriber, a phone service and a third party.

18. The computer program product for social network based call management of claim 14, wherein the rule comprises call processing options comprising block, allow, route and forward.

19. A social network based call management system for managing telephone calls, the social network based call management system comprising:

a network for communicating a call between telephones of a caller and a subscriber on the network;

a set of servers connected to the network, wherein a call management service and a set of preferences for the subscriber of the call management service are located on the set of servers;

a social network site connected to the network, wherein the social network site contains attribute information for a relationship between the subscriber and the caller;

wherein the social network site is an online community of people with common interests allowing to communicate and share information with each other; and wherein the call management service uses the attribute information with the set of preferences to process the call.

* * * * *